US008396876B2

(12) United States Patent
Kennedy et al.

(10) Patent No.: US 8,396,876 B2
(45) Date of Patent: Mar. 12, 2013

(54) IDENTIFYING RELIABLE AND AUTHORITATIVE SOURCES OF MULTIMEDIA CONTENT

(75) Inventors: Lyndon Kennedy, Santa Clara, CA (US); Malcolm Slaney, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 192 days.

(21) Appl. No.: 12/957,335

(22) Filed: Nov. 30, 2010

(65) Prior Publication Data

US 2012/0136853 A1    May 31, 2012

(51) Int. Cl.
*G06F 17/30* (2006.01)
*G06N 5/02* (2006.01)

(52) U.S. Cl. .......................................... 707/748; 706/45

(58) Field of Classification Search ..................... 706/45; 707/731, 748
See application file for complete search history.

(56) References Cited

U.S. PATENT DOCUMENTS

| | | | |
|---|---|---|---|
| 6,094,508 A | 7/2000 | Acharya et al. | |
| 6,285,999 B1 * | 9/2001 | Page | 1/1 |
| 6,701,009 B1 | 3/2004 | Makoto et al. | |
| 6,987,876 B2 | 1/2006 | Silber et al. | |
| 7,003,174 B2 | 2/2006 | Kryukov et al. | |
| 7,103,838 B1 * | 9/2006 | Krishnamurthy et al. | 715/202 |
| 7,293,063 B1 | 11/2007 | Sobel | |
| 7,373,385 B2 | 5/2008 | Prakash | |
| 7,665,131 B2 | 2/2010 | Goodman et al. | |
| 2002/0055940 A1 * | 5/2002 | Elkan | 707/104.1 |
| 2002/0198866 A1 * | 12/2002 | Kraft et al. | 707/3 |
| 2004/0036923 A1 | 2/2004 | Kokemohr et al. | |
| 2004/0075744 A1 | 4/2004 | Newman | |
| 2004/0218804 A1 | 11/2004 | Affleck et al. | |
| 2005/0135670 A1 | 6/2005 | Vaidyanathan | |
| 2005/0165780 A1 * | 7/2005 | Omega et al. | 707/7 |
| 2006/0093998 A1 | 5/2006 | Vertegaal | |
| 2006/0129538 A1 * | 6/2006 | Baader et al. | 707/3 |
| 2006/0248076 A1 * | 11/2006 | Troy et al. | 707/5 |
| 2006/0251322 A1 | 11/2006 | Palum | |
| 2006/0274210 A1 | 12/2006 | Kim | |
| 2007/0030396 A1 | 2/2007 | Zhou et al. | |
| 2007/0237426 A1 * | 10/2007 | Xie et al. | 382/305 |
| 2007/0239704 A1 * | 10/2007 | Burns et al. | 707/5 |
| 2007/0253040 A1 | 11/2007 | Lee et al. | |

(Continued)

OTHER PUBLICATIONS

Boucher, A., "Alain Boucher—Publications," accessed Oct. 23, 2007, 3 pages http://www.ifi.auf.org/personnel/Alain.Boucher/publis/.

(Continued)

*Primary Examiner* — Jorge A Casanova
(74) *Attorney, Agent, or Firm* — Frommer Lawrence & Haug LLP; Jamie L. Wiegand

(57) ABSTRACT

Embodiments are directed towards identifying authoritative sources of multimedia content useable in rank ordering class-dependent search-query results of multimedia content. In one embodiment, a citation model is employed for measuring or otherwise determining a strength of an authority to a content source. In one embodiment, a directed graph is constructed over a network of sources based on a propensity of one source to "cite" content provided by another source. In one embodiment, a random walk may be conducted across the network of sources to arrive at authority scores for each source in the network. In another embodiment, a machine-learning algorithm may be used to arrive at authority scores. The authority scores may then be applied for ranking, for example, search-query results, and/or retrieval purposes.

19 Claims, 10 Drawing Sheets

U.S. PATENT DOCUMENTS

| | | | |
|---|---|---|---|
| 2007/0280551 | A1 | 12/2007 | Oztan et al. |
| 2008/0091765 | A1 | 4/2008 | Gammage et al. |
| 2008/0140781 | A1 | 6/2008 | Bocharov et al. |
| 2008/0299960 | A1* | 12/2008 | Lockhart et al. ............ 455/418 |
| 2009/0043853 | A1 | 2/2009 | Wei et al. |
| 2009/0113003 | A1 | 4/2009 | Lu et al. |
| 2012/0005203 | A1* | 1/2012 | Brzozowski et al. ......... 707/732 |
| 2012/0117059 | A1* | 5/2012 | Bailey et al. .................. 707/723 |

OTHER PUBLICATIONS

"Edge Detection," Wikipedia, the free encyclopedia, accessed Oct. 15, 2007, 5 pages http://en.wikipedia.org/w/index.php?title=Edge_detection&printable=yes.

Ke, Y. et al., "Efficient Near-Duplicate Detection and Sub-Image Retrieval," MM '04:Oct. 10-16, 2004, 8 pages.

Tran, H. et al., "A Novel approach for Text Detection in Images Using Structural Features," Lecture Notes in Computer Science, vol. 3686, 2005, 10 pages.

Fisher, R. et al., "Sobel Edge Detector," accessed Oct. 23, 2007, 7 pages http://homepages.inf.ed.ac.uk/rbf/HIPR2/sobel.htm.

Pietikainen, M. et al., "Edge-Based Method for Text Detection from Complex Document Images," Document Analysis and Recognition,University of Oulu, Finland, 2001, 6 pages.

Ahern, S. et al., "Summarization of Online Image Collections via Implicit Feedback" in WWW '07: Proceedings of the 16th International Conference on World Wide Web, May 8-12, 2007, pp. 1325-1326.

Cheng, E., et al., "Scalable Relevance Feedback Using Click-Through Data for Web Image Retrieval" in Multimedia '06: Proceedings of the 14th annual ACM International Conference on Multimedia, Oct. 23-27, 2006, pp. 173-176.

Flickner, M. et al., "Query by Image and Video Content: the QBIC System," Computer, vol. 28, No. 9, Sep. 1995, pp. 23-32.

Hsu, W. H., et al., "Video Search Reranking through Random Walk Over Document-Level Context Graph" in ACM Multimedia, Augsburg, Germany, Sep. 23-28, 2007, 10 pages.

About interestingness, accessed May 6, 2011, 1 page http://www.flickr.com/explore/interesting.

Jiang, Q. et al., "SiteRank-Based Crawling Ordering Strategy for Search Engines," in Proceedings of the 7th IEEE International Conference on Computer and Information Technology, IEEE Computer Society, 2007, pp. 259-263.

Kennedy, L., "Advanced techniques for Multimedia Search: Leveraging Cues from Content and Structure," Ph.D. thesis, Columbia University Graduate School of Arts and Sciences, 2009, 185 pages.

Kennedy, L. et al., "Internet Image Archaeology: Automatically Tracing the Manipulation History of Photographs on the Web," Multimedia '08: Proceeding of the 16th ACM International Conference on Multimedia, Oct. 26-31, 2008, 10 pages.

Kennedy, L. et al., "Query-Adaptive Fusion for Multimodal Search" Proceedings of the IEEE, vol. 96, No. 4, Apr. 2008, pp. 567-588.

Kennedy, L. et al., "Reliable Tags Using Image Similarity: Mining Specificity and Expertise from Large-Scale Multimedia Databases," WSMC '09: Proceedings of the 1st Workshop on Web-Scale Multimedia Corpus, Oct. 23, 2009, pp. 17-24.

Liu, J. et al., "Video Search Re-ranking Via Multi-Graph Propagation" Multimedia '07: Proceedings of the 15th International Conference on Multimedia, Sep. 23-28, 2007, pp. 208-217.

Lowe, D., "Distinctive Image Features from Scale-Invariant Keypoints" International Journal of Computer Vision, vol. 60, No. 2, Nov. 2004, pp. 91-110.

Murphy, K., "First Camera, Then Fork," The New York Times, Apr. 7, 2010, 4 pages http://www.nytimes.com/2010/04/07/dining/07camera.html.

Page, L. et al., "The PageRank Citation Ranking: Bringing Order to the Web," Technical Report, Computer Science Department, Stanford University, Jan. 29, 1998, 17 pages.

Google Press Center: Fun Facts, 2011 http://www.google.com/press/funfacts.html.

Schmidt, E. et al., "SiteRank: Link-Based Relevance Computation for Persistent Search," Technical Report, 745-06, Department of Computer Science, Princeton University, Feb. 2006, 24 pages.

Lowe, D., "Demo Software: SIFT Keypoint Detector," SIFT Demo Program, Jul. 2005, 3 pages http://www.cs.ubc.ca/~lowe/keypoints/.

Smith, J. et al., "VisualSEEk: A Fully Automated Content-Based Image Query System," Proceedings of the 4th ACM International Conference on Multimedia, Nov. 18-22, 1997, pp. 87-98.

Srinivasan, S. H. et al., "Finding near-Duplicate Images on the Web Using Fingerprints," Multimedia '08: Proceeding of the 16th ACM International conference on Multimedia, Oct. 26-31, 2008, pp. 881-884.

Wu, J. et al., "Using SiteRank in P2P Information Retrieval," Technical Report, IC/2004/31, Swiss Federal Institute of Technology, Mar. 24, 2004, 20 pages.

Yan, R. et al., "Learning Query-Class Dependent Weights in Automatic Video Retrieval," Multimedia '04: Proceedings of the 12th Annual ACM International Conference on Multimedia, Oct. 10-16, 2004, pp. 548-555.

Zhang, D.-Q. et al., "Detecting Image Near-Duplicate by Stochastic Attributed Relational Graph Matching with Learning," Multimedia '04: Proceedings of the 12th Annual ACM International Conference on Multimedia, Oct. 10-16, 2004, pp. 877-884.

Aybar, E., "Sobel Edge Detection Method for MATLAB," Anadolu University, Porsuk Vocational School, 2006, 5 pages.

"Data Sheet for Sobel Edge Detection Core," SoftJin Technologies Pvt. Ltd., Bangalore, India, accessed May 11, 2011, 5 pages http://www.softjin.com/IP_Datasheet_PDF_version/sobel_edge_datasheet.pdf.

* cited by examiner

Example Class Dependency Categories

Travel
Sports
Automotive
Entertainment
- Movies
- Television
- Games
- Music
News
Science
Retail
People
- Historical Figures
- Athletes
- Models
-Actors & Actresses
- Authors
Technology
Pets

IDENTIFYING RELIABLE AND AUTHORITATIVE SOURCES OF MULTIMEDIA CONTENT

TECHNICAL FIELD

The present invention relates generally to Search Content Analysis and Indexing and, more particularly, but not exclusively to identifying a query class-dependent authoritative source of multimedia content for use in rank ordering search results.

BACKGROUND

Retrieval of multimedia content collections remains an important and challenging problem. Millions of photographs are added to the web every day and users increasingly require mechanisms for managing and navigating these massive collections. The challenge in meeting this need lies, in part, in the fact that the actual information contained in multimedia content, such as images, and videos (e.g., matrices of pixels and/or streams of audio) does little to reveal the actual semantic meaning of the media.

Various approaches to multimedia information retrieval relied almost exclusively upon content and contextual cues that could be extracted from the media itself and its associated metadata. The content cues, however, typically are limited to distributions of low-level features, such as color, texture, and/or edges in the images, while the contextual cues range from snippets of associated text terms to timestamps or geo-tags. However, many of the contextual cues may be provided based on an individual's perspective, often providing minimum value to other individuals. That is, many of the contextual cues, such as keywords, tags, or the like, are viewed as being too noisy, or personalized, to often be relevant to many searches over multimedia content collections. Because of this semantic gap, there remains a need for improved mechanisms for managing such multimedia content collections. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 10 illustrates one non-limiting, non-exhaustive example of possible class-dependent categories useable for class-dependent search queries.

DETAILED DESCRIPTION

Figure 1:
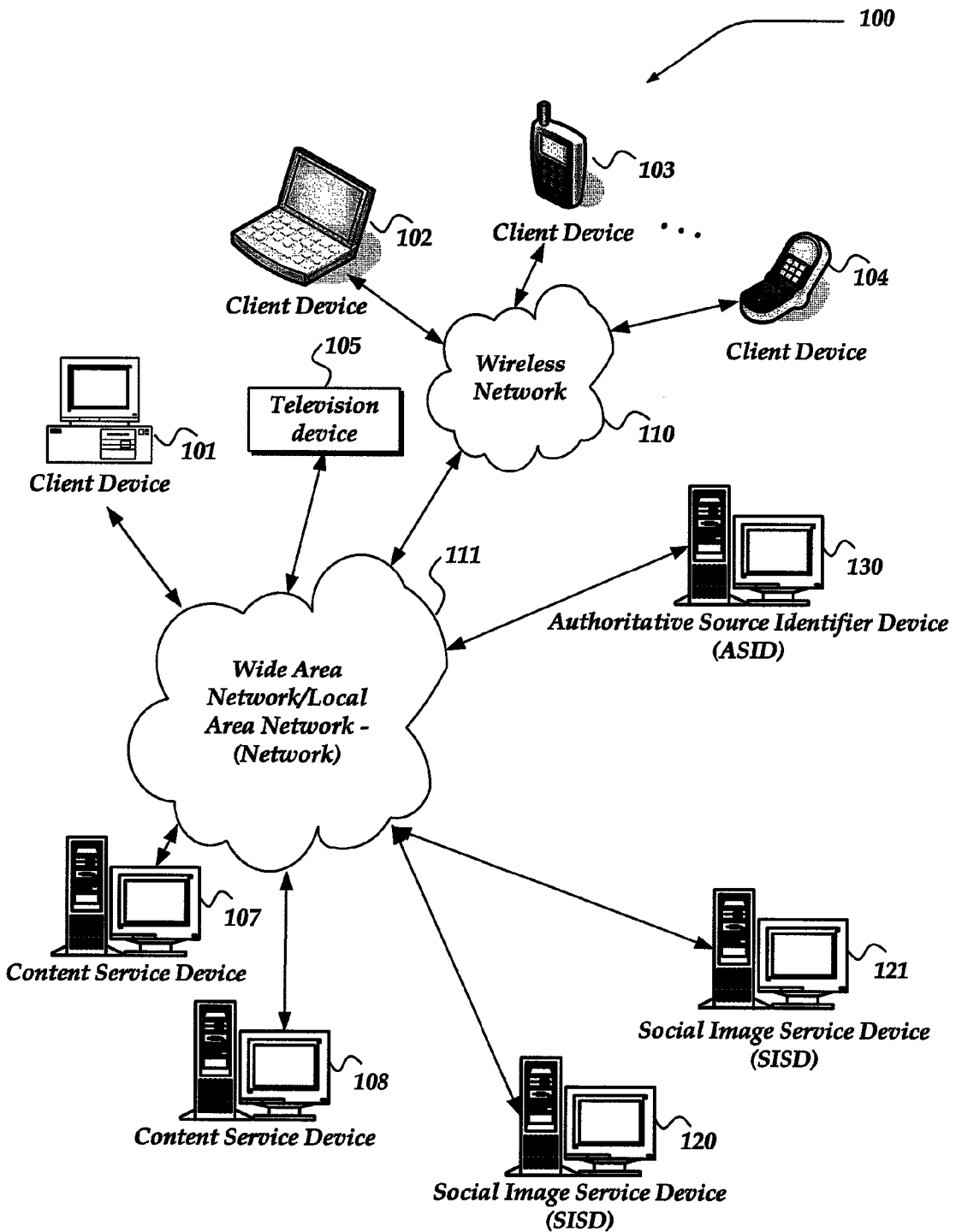
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "multimedia content" refers to any content accessible over a network, including, one or more of images, video clips, video stills, or other graphical content, audio clips, and/or textual content, independent of the format in which such multimedia content may be communicated, stored, displayed or otherwise accessed.

As used herein, the term "authoritative source" refers to those entities within a network which are identified as providing relevant multimedia content in response to at least a particular class of search queries. A source can be one or more of any number of entities, such as a particular new organization, institution, publication, a domain name, a specific user on a social networking site, such as a photo sharing website, or the like. A source generally, therefore, is any entity that produces, disseminates, or consumes multimedia content for access by others over a network. As used herein, the term "citation" refers to an indication that one source references a piece of multimedia from another source. It is reasoned that some sources are more likely to be producers of high-quality, relevant, or interesting multimedia content for a given query than other sources. Therefore, this quality may be reflected by a centrality of the source in a resulting source citation analysis. In one embodiment, such source citation analysis may result in generation of a source-citation network. However, other source-oriented analysis may generate hierarchical tables, linked lists, or even weightings for a machine-learning algorithm.

As used herein, the term "machine-learning" refers to any of a variety of machine implemented algorithms that are employed to evolve behaviors based on input data, including, for example, recognizing complex patterns and making intelligent decisions based on the input data, including, such as pattern recognition, classification, and similar actions. Thus, machine-learning algorithms include decision trees, neural networks, support vector machine algorithms, clustering, Bayesian networks, inductive logic programming, and so forth.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards identifying authoritative sources of multimedia content useable in rank-ordering class-dependent search-query results of multimedia content. In one embodiment, a citation model is employed for measuring or otherwise determining a strength of an authority to a content source. In one embodiment, a directed graph, or citation network, is constructed over a network of sources based on a propensity of one source to "cite" content provided by another source. In one embodiment, a random walk may be conducted across the network of sources to arrive at authority scores for each source in the network, where each authority score indicates a propensity or strength of an authority to a content source. The authority scores (also termed herein as an authority source score) may then be applied for ranking and retrieval purposes. Such ranking refers to an ordered set of items based on the determined authority scores. Such ranking might be from highest weighted authority scores to lowest weighted authority scores, but is not so limited, and other ranking may also be employed.

Two non-exhaustive, non-limiting approaches are described below for applying the model in differing domains. In one domain, web sites are identified as sources for web image retrievals, based on the notion that images are cited by being copied and reused across various web sites. In this domain, a directed edge may be constructed to an original source from another site that copied the image. In another domain, users are identified as sources of web images within social media sites, based on the notion that marking another user's image as a favorite or providing similar indicators, is a form of citation. In both domains, either primary sources or influential sources of image media are identified while avoiding computational costs or time-delay effects of traditional approaches.

It should be noted that while directed graphs are described below, the invention is not to be construed as being limited to this form of identifying authoritative sources. Thus, in another embodiment, machine-learning models may be employed to identify patterns useable to identify the authoritative sources. Further, the invention is not limited to the two example domains described below, and other domains may also employ the invention. Thus, the example domains are not to be construed as limiting the scope of the invention.

It should also be recognized that while the disclosure is described in terms of multimedia content, the invention is not so limited. Thus, in other embodiments, other content, and the like, may also be used, including, for example, content having exclusively textual content, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 111, wireless network 110, client devices 101-105, content service devices 107-108, Social Image Service Devices (SISDs) 120-121, and Authoritative Source Identifier Device (ASID) 130.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). For example, the user of the client device may select to manage various web postings, such as blog postings, postings of articles, posting of photographs, and or other images, video content, audio content, or the like. Similarly, the user of the client device may also employ the browser application to access postings by others, including textual postings, web pages, blogs, news articles, images, and/or any of a variety of other content accessible over networks 110-111. Furthermore, the browser application may allow a user to conduct any of a variety of search queries for content accessible over networks 110-111. However, another application may also be used to perform various online activities.

For example, client devices 101-105 also may include at least one other client application that is configured to receive and/or send content, including User Generated Content (UGC), between another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, content service devices 107-108, SISDs 120-121, or other computing devices.

Client devices 101-105 may further be configured to include a client application that enables an end-user to log into an end-user account that may be managed by another computing device, such as content service devices 107-108, SISDs 120-121, or the like. Such end-user account, for example, may be configured to enable the end-user to manage one or more online activities, including for example, search activities, social networking activities, browse various websites, make purchases, sell products/services, communicate with other users, or share content with others, or the like. However, participation in such online networking activities may also be performed without logging into the end-user account.

Moreover, client devices 101-105 may be configured to operate to send messages, and other content for posting through and/or on a content service device, such as 107-108. That is, in one embodiment, a user of client devices 101-105 may select to create and/or otherwise post content within a blog, webpage, or the like, hosted by one or more of content service devices 107-108 and/or SISDs 120-121.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, content service devices 107-108, SISDs 120-121, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content service devices 107-108 include virtually any network device usable to operate as website servers to provide content to client devices 101-105. Such content may include, but is not limited to webpage content, advertisements, professionally generated content (non-UGC content), search results, blogs, and/or any of a variety of User Generated Content for access by another client device. For example, in one embodiment, content services devices 107-108 might include one or more search engines configured to allow a user to perform network searches for various content. In one embodiment, such search engines might operate in conjunction with ASID 130 to provide ranked ordering of search results based on an authoritative measure for a source of the results of the search-query, such as described further below.

Content service devices 107-108 may also operate as a messaging server such as an SMS message service, IM message service, email message service, alert service, or the like. Moreover, content service devices 107-108 may also operate as a File Transfer Protocol (FTP) server, a database server, music and/or video download server, or the like. Additionally, content service devices 107-108 may be configured to perform multiple functions.

SISDs 120-121 may include any computing device capable of connecting to network 111 to provide social image sharing, and other multimedia content. For example, SISDs 120-121 might represent various social content sharing sites, including, but not limited to Flickr, Facebook, YouTube, or the like. In one embodiment, SISDs 120-121 may be configured to enable content viewers to provide comments about various images, and/or other content available at SISDs 120-121. Similarly, SISDs 120-121 may allow a viewer to provide a rating of the available content, including marking the content as a favorite, or the like. SISDs 120-121 are not limited to these mechanisms for allowing a viewer of the social content to provide interactional cues about the viewed content, and virtually any mechanism for identifying content quality may be employed.

SISDs 120-121 thus represent various websites, and other network content sites that may be provide content that is typically authored by potentially millions of different authors, as opposed to such sites resident in one or more of content service devices 107-108.

One embodiment of ASID 130 is described in more detail below in conjunction with FIG. 3. Briefly, however, ASID 130 represents one or more network devices configured to perform search content analysis and indexing based on identifying authoritative sources of various multimedia content. Thus, in one embodiment, ASID 130 may perform a plurality of query class-dependent searches over content available from, for example, content service devices 107-108 and/or SISDs 1201-21. ASID 130 may then, based on the employ a citation model to measure or otherwise determine a strength of an authority of a content source identified within the search results. In one embodiment, a directed graph may be constructed by ASID 130 over a network of sources based on a propensity of a source to "cite" content provided by another source. Authoritative sources may then be scored based on which sources are determined to be more likely to provide high-quality, relevant media in response to the various query class-dependent searches. The authority scores may then be applied to results from subsequent search-query results to sort or rank the results for display to a search requester.

In one embodiment, a user of client devices 101-105 may perform the search-query, through, for example, a search engine resident on content service devices 107-108, and/or ASID 130. The results may be rank ordered by ASID 130 and provided for display to the requester client device. In one embodiment, ASID 130 may employ processes such as are described below in conjunction with FIGS. 4-6 to perform at least some of its actions.

Devices that may operate as content servers 107-18, SISDs 120-121, and/or ASID 130 include various network devices, including, but not limited to personal computers, desktop computers, multiprocessor systems, microprocessor-based or programmable consumer electronics, network PCs, server devices, network appliances, and the like. It should be noted that while ASID 130 is illustrated as a single network device, the invention is not so limited. Thus, in another embodiment, ASID 130 may represent a plurality of network devices.

Moreover, ASID 130 is not limited to a particular configuration. Thus, in one embodiment, ASID 130 may operate using a master/slave approach over a plurality of network devices, where one of the network devices for ASID 130 operates to manage and/or otherwise perform authoritative scoring, while another ASID 130 perform search results ranking based on the resulting authoritative scoring of the sources of the results to each search-query. In other embodiments, the ASID 130 may operate within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
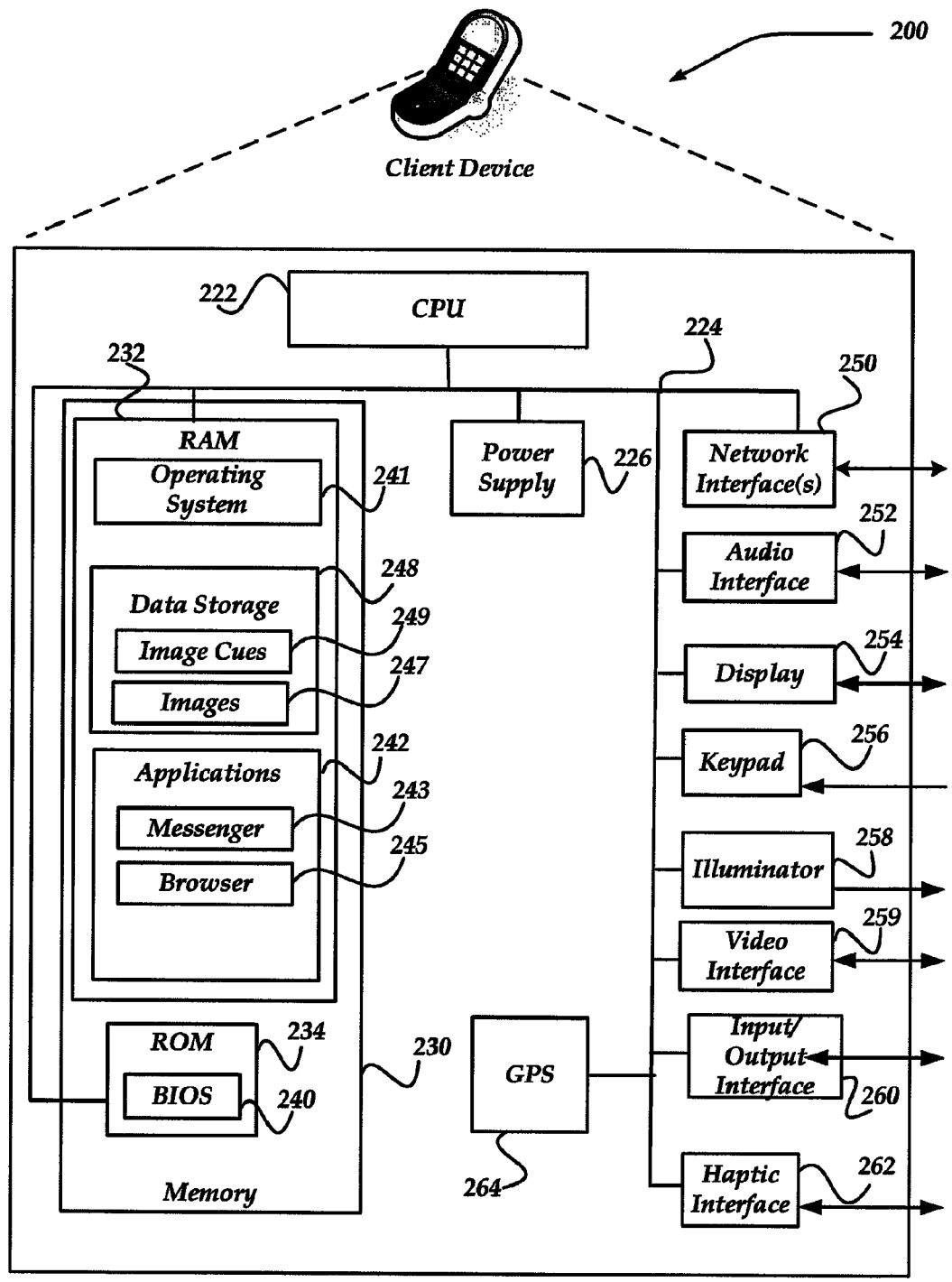
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, multimedia content, or the like. Further, as illustrated, data storage 248 may also store messages, web page content, or any of a variety of user generated content. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VoIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive content between another computing device for posting, reading, and/or otherwise communicating with another client device. Similarly, browser 245 may enable a user of client device 200 to access one or more search engines to perform various search queries for content, including image content, and/or other multimedia content.

Messenger 243 may be configured to manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
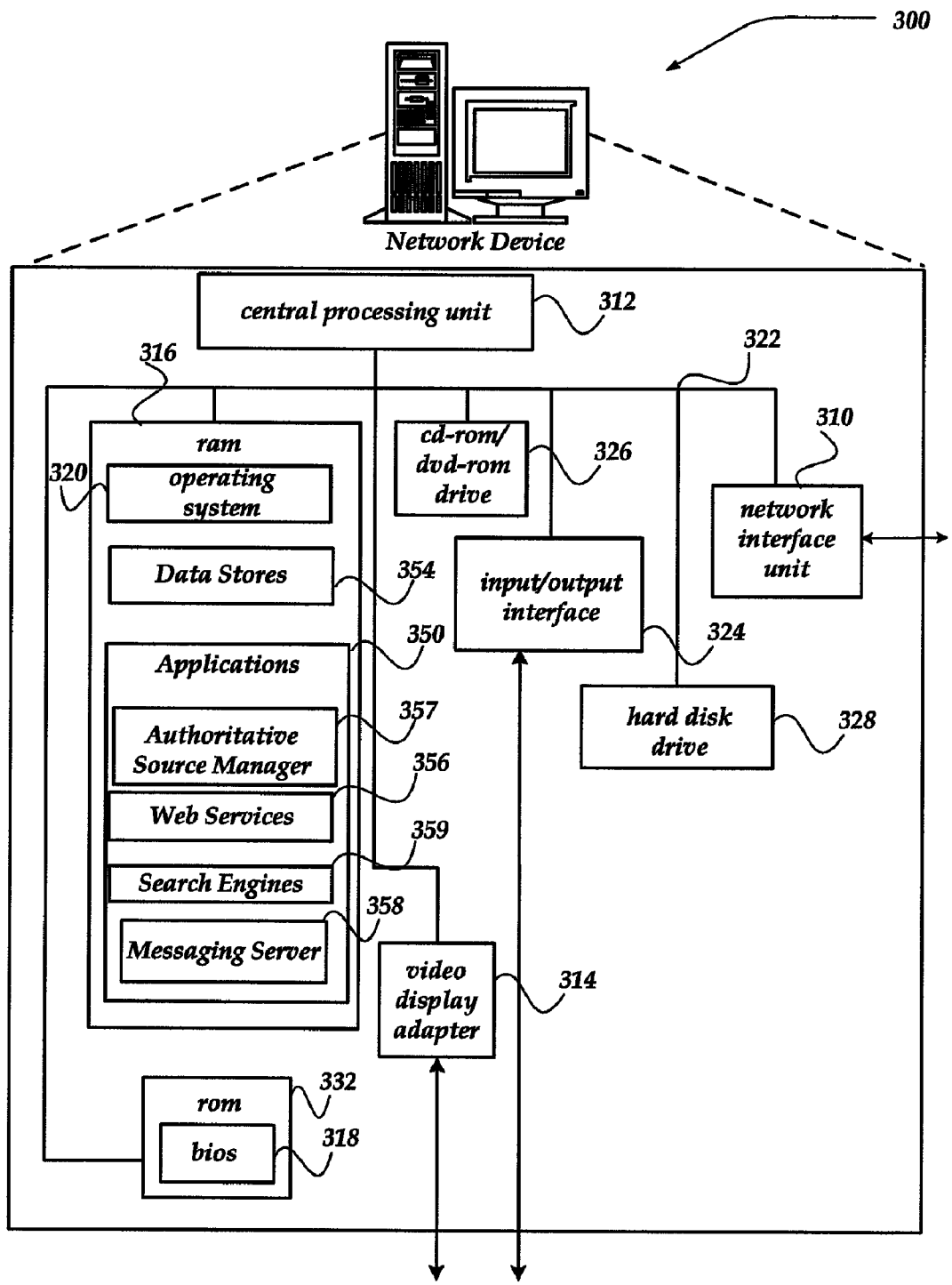
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, ASID 130 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various authoritative scores, citation models, and the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging server 358, search engines 359, and Authoritative Source Manager (ASM) 357, may also be included as application programs within applications 350.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types. In one embodiment, messaging server 358 may enable users to initiate and/or otherwise conduct chat sessions, VOIP sessions, or the like. As noted elsewhere, messages are also considered as one type of UGC content.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive content, including multimedia content from another network device, such as a client device, or the like. Web services 356 may then enable a user to prepare and/or otherwise manage the content for access by various other users. As such, web services 356 may allow users to manage blog pages, social content sharing sites, or the like. Further, web services 356 may enable various users of client devices to access, read, and even comment on various content. For example, web services 356 may allow a user to identify various content as their favorite content. Similarly, web services 356 may allow a user to copy content from one sight, then using any of a variety of content editing applications, modify the content, and/or post the modified content on another website. Thus, in one embodiment, a user might access, for example, an image from one website, crop or otherwise modify the image, and post the modified image on another site.

Web services 356 may also enable a user to access one or more search engines 359 to perform various search queries for content, including image content, textual content, and/or any of a variety of other multimedia content. In one embodiment, the search engines 359 may be configured to provide a result of a search-query to ASM 357, where ASM 357 may then rank order the results of the search-query based, in part, on an authoritative score for a source associated with a search result.

ASM 357 is configured to identify a query class-dependent authoritative source of multimedia content for use in rank ordering search results and/or other retrieval purposes. In one embodiment, ASM 357 may employ a citation model for measuring or otherwise determining a strength of an authority to a content source. ASM 357 may further construct a directed graph over a network of sources based on a propensity of one source to "cite" content provided by another source. In one embodiment, a random walk may be conducted across the network of sources to arrive at authority scores for each source in the network.

While in one embodiment, ASM 357 may employ a directed graph, ASM 357 is not to be construed as being limited to this form of identifying authoritative sources. Thus, in another embodiment, ASM 357 may employ machine-learning models, or the like, to identify patterns useable to identify the authoritative sources. In any event, ASM 357 may employ processes such as are described below in conjunction with FIGS. 4-6 to perform at least some of its actions.

Generalized Operation

The operation of certain aspects of the invention will now be described with respect to FIGS. 4-6. The operations of the processes described below for FIGS. 4-6 may, in one embodiment, be performed within one or more network devices, such as ASID 130 of FIG. 1.

Briefly, the invention is directed towards examining how various content, such as multimedia content, is produced. In particular, the invention examines a source of the content, meaning a specific web site, a user, an IP address, or the like, that is providing the content. Then a characterization of how authoritative this source is may be performed and how likely it is to provide content that is determined to be frequently relevant, interesting, and/or otherwise reliably relevant to subsequent searches and/or other content retrieval activities. This characterization may be reflected in an authority score for the source, as described further below.

In traditional consumption-based approaches, many systems require the content to be existent and discoverable for some period of time in order for some statistics on viewing or rating patterns to be collected. This often leads to a problem of time lag with fresh content. However, as disclosed herein, instead, embodiments determine "Who produced the content? Are they frequent providers of relevant or influential content?" If so, then this knowledge is used as a cue that indicates that the content may be taken on its face value to either be interesting or authoritative or otherwise include reliable metadata.

As described below, authoritative sources may be found via analysis of citation networks, in one embodiment. A graph or citation network may be constructed of sources and their relative propensities to "cite" each other. Then, any of a variety of ranking techniques may be applied to the citation network of sources to determine an authority of each source within the citation network graph. In one embodiment, a ranking mechanism such as PageRank may be used. However, the invention is not so limited, and machine-learning techniques, or the like, may also be employed as a ranking mechanism.

It is noted, that an exact definition of a source and multimedia citation may be a function of various domains or applications. Therefore, two non-limiting, non-exhaustive applications or domains are described in conjunction with the invention. In one application or domain, a propensity of web sites to copy images from each other is disclosed. Copying may be defined as a form of quotation or citation and employed to find sites that are often primary sources for iconic imagery that is copied by others. In another application or domain, a social image-sharing application, actions of users marking an image as a favorite, or performing similar actions, may be used to indicate a form of citation.

It is recognized that not all authoritative sources are authorities for all types of queries. For example, one might trust ESPN, or the like, more for queries related to athletics, while a source such as Wikipedia might be trusted more for queries related to historical figures, or the like. Thus, as discussed below, embodiments employ a query class-adaption of source authority, where source graphs are constructed over sources that provide responses to selected classes of queries—e.g., class-dependent queries. Thus, unlike traditional approaches various embodiments of the invention employs a recognition of an importance of the source of a piece of content, and develops a framework for analyzing the ways in which image sources cite each other to identify authoritative sources with this citation network. Further, such framework is adapted to have differing authority sources for sources based upon a type of query being answered by slicing the network of possible sources by their propensity to provide content relevant to selected classes of queries.

Figure 4:
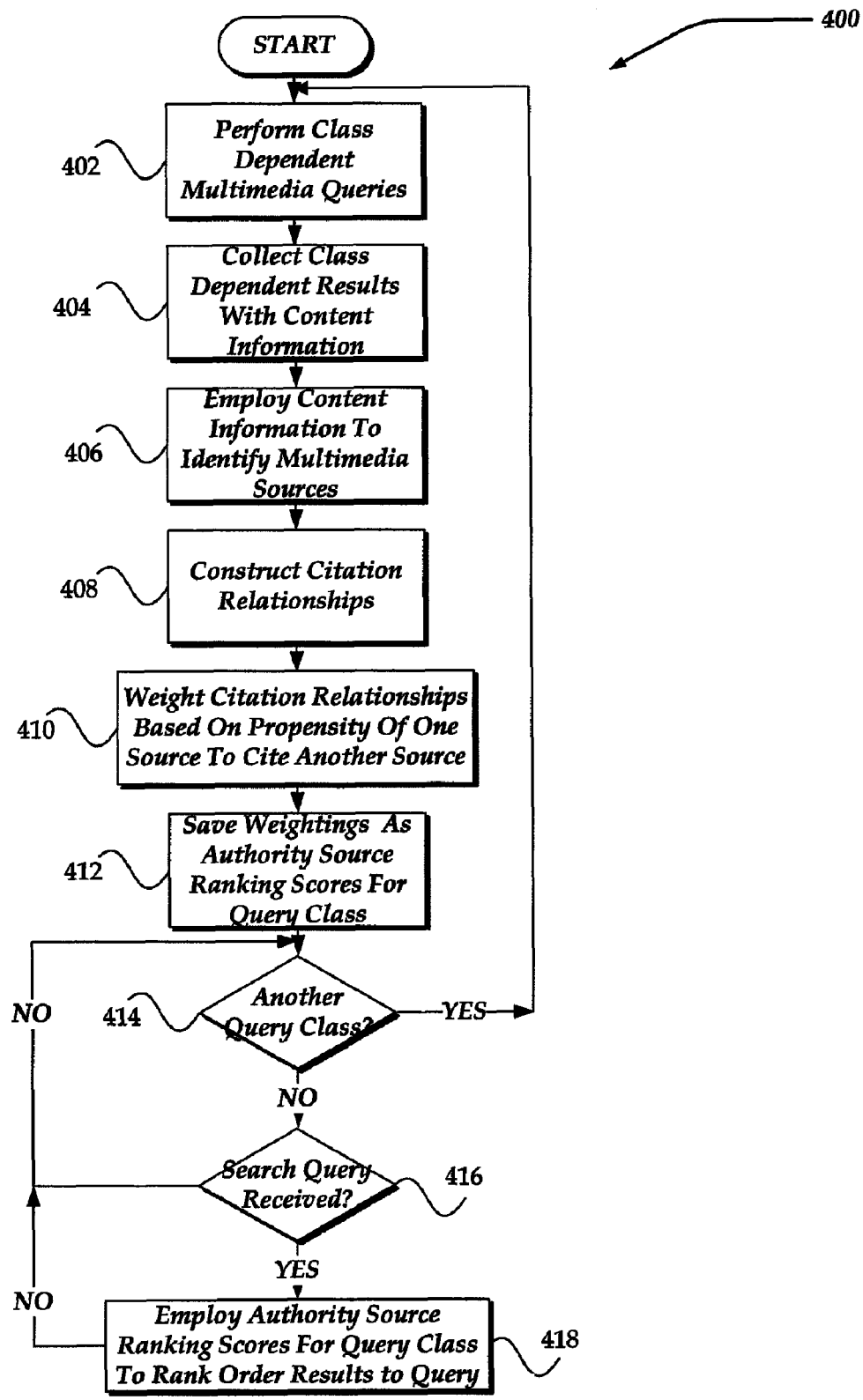
FIG. 4 illustrates a logical flow generally showing one embodiment of an overview process for use in identifying authoritative sources of multimedia content useable in rank ordering multimedia search-query results.

Thus, FIG. 4 illustrates a logical flow generally showing one embodiment of an overview process for use in identifying authoritative sources of multimedia content useable in rank ordering multimedia search-query results.

Process 400 of FIG. 4 begins, after a start block, at block 402, where a plurality of class-dependent queries is performed for multimedia content. In one embodiment, hundreds of thousands of class-dependent queries may be performed against various web image search engines sites, collecting a top thousand or so returned images. Proceeding to block 404, along with the results of each query, various content information (information about the content) is also obtained. For example, the various content information may include, but is not limited to information about the source of the content, such as a URL of the content, a URL of a web page associated with the content, a URL of a web page that refers to the content itself, as well as HTTP headers for each content to obtain various information about the content. Content information may also therefore include virtually any other metadata about the multimedia content; characteristics of the multimedia data; and/or information about various features of the multimedia content. For example, such information might include a "last-modified" date for the content, and the like. Thus, content information is not to be construed as being limited to a particular type of information about the content.

As an aside, in one embodiment, the invention is not constrained to performing such search queries. For example, other mechanisms may also be employed to identify multimedia content and their related content information for class-dependent analysis. Thus, in one embodiment, process 400 might be construed as selecting or otherwise receiving such class-dependent results from one or more different mechanisms, for subsequent analysis, proceeding from block 406.

Process 400 then flows to block 406, where the content information is employed to identify a source of the content obtained from the search queries. As disclosed above, such sources may be persons, institutions, publications, or any other entity that produces, labels, disseminates, or other consumes the content. Continuing to block 408, a citation network illustrating relationships may be constructed such that each node in the citation network represent a source and edges are placed between the nodes and are weighted based on a propensity of one source to cite to another source. Edges are directed towards the source being cited. The weights of all outgoing edges for each node may, in one embodiment, be normalized to sum to a selected value, such as one, or the like. Then any of a variety of mechanisms may be employed over the citation network of relationships.

Proceeding to block 410, in one embodiment, a random walk might be performed over the citation network of relationships with random restarts to generate a stationary probability distribution over the nodes. The generated probability distribution may then be employed to provide a ranking of each of the sources according to their relative authority to be cited. Other mechanisms, including for example, a machine-learning algorithm, or the like, may also be employed to generate a probability distribution useable to provide rankings of the sources.

Continuing to block 412, the weightings obtained from the probability distribution may then be saved as the ranking scores for each of the sources identified in the query results to produce authority source ranking scores. Flowing next to decision block 414, a determination is made whether to modify the class for which to another query search is to be performed. If so, then process 400 returns to block 402, where a different query class is selected for which authoritative sources may be obtained. If, no more query classes are to be examined, then processing flows to decision block 416.

At decision block 416, a determination is made whether a user search-query is received. If not, then processing loops back to decision block 414, to determine whether to update the authority scores for a given query dependent class. However, if a user search-query is received, then processing flows to block 418, where the earlier determined authority source ranking scores may be employed to rank order a result of the user's search-query. In one embodiment, a determination is made upon the user's search-query to determine what class the search-query might fall within. Then, based on the determined class, class-dependent authority scores may be used. The rank ordered results may then be provided to the user's client device for display.

While decision block 416 and block 418 discuss search-query results being rank ordered, the invention is not so limited, and virtually any class-dependent multimedia retrieval activity may be rank ordered based on the determined authoritative scores. In any event, processing then flows to decision block 414, to determine whether to update the authority scores for a given query dependent class.

If the process as described above for constructing a citation network was performed over a heterogeneous collection of sources, then the result would be expected to be a query-independent ranking of sources. However, as discussed, some sources may be more specialized than others, meaning that a general ranking of authority might not be applicable for all types of queries. Thus, as described in at least process 400 of FIG. 4, above, the process results may be improved by finding more-specific subgraphs, where the sources are likely to be constrained to selected classes of topics. Thus, applying process 400 to subgraphs, the resulting rankings of nodes may be found to be different from the general case and unique to the specific topics of the sources that are sub-selected. Such analysis over topic-sensitive subgraphs may be called query class-dependent rankings and may be utilized separately based on the type of query being addressed.

Figure 7:
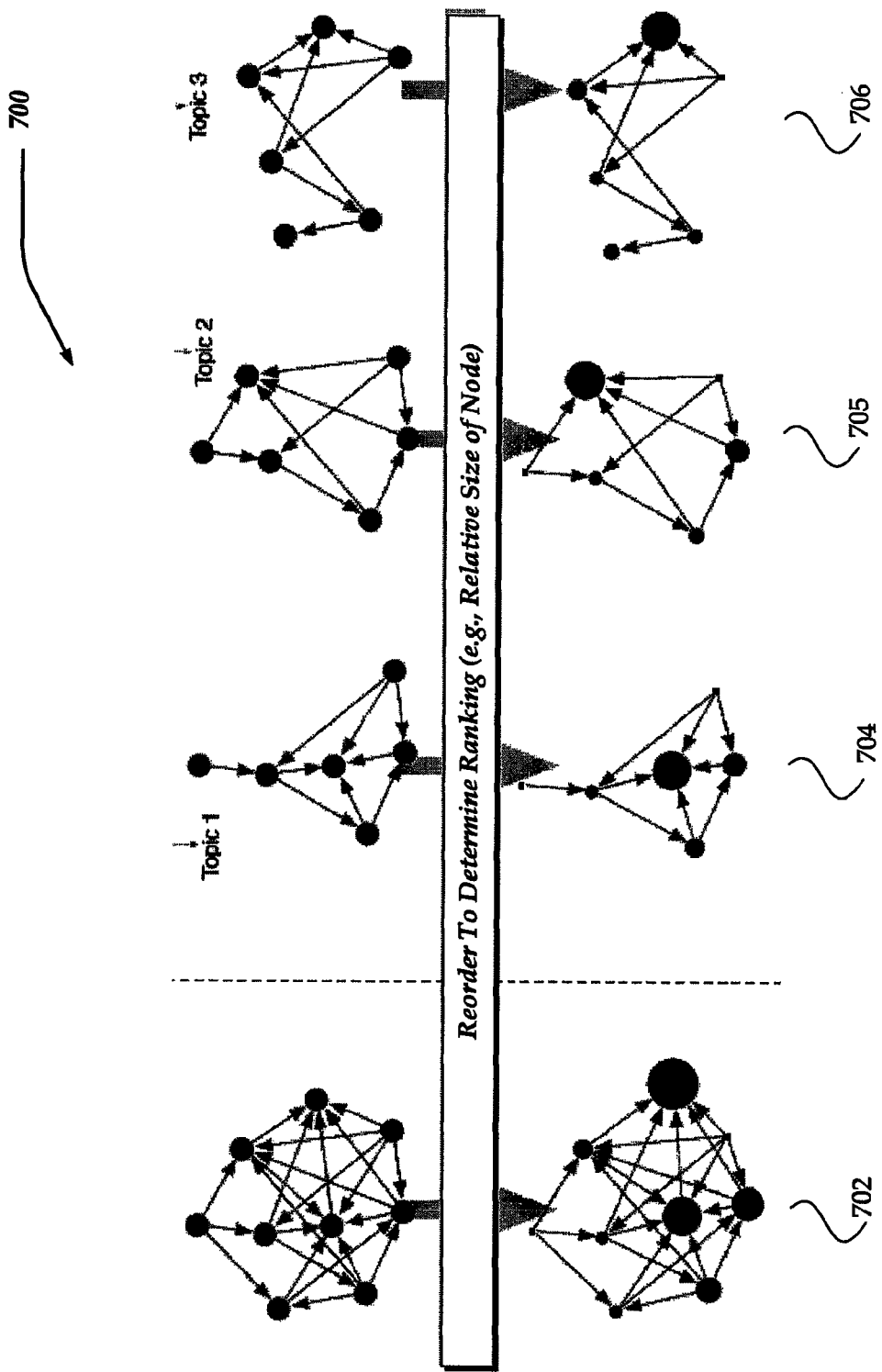
FIG. 7 illustrates non-limiting, non-exhaustive examples of query class-independent and query class-dependent rankings.

FIG. 7 illustrates one non-limiting, non-exhaustive example of query-independent and query class-dependent rankings Shown in example 700 are hypothetical visualizations of query-independent process 702 and query class-dependent processes 704-706. In the upper portions of each of the processes 702 and 704-706 are shown citation networks as constructed. Once each citation network is subjected to a ranking mechanism, relative rankings of the various sources, may be visualized based on various sizes of each node. This is illustrated in the lower portions of each of the processes 702 and 704-706. The more authoritative a source is determined to be, the larger its respective node is.

In processes 704-706, the upper portions show three different subgraphs that might be extracted from the original graph from the upper portion of process 702, and analyzed separately. Note that these graphs may be found by simply sub-selecting some of the nodes from the larger graph and retaining (and re-weighting) the edges between these nodes. After applying the selected ranking mechanism to each graph, it may be seen that each source may ultimately be weighted differently depending upon an incoming subgraph structure.

As noted above, the definition of sources and citations may be left open and adjusted based on a given application domain. Thus, the following processes described below in conjunction with FIGS. 5-6 refine process 400 of FIG. 4 based on two non-limiting, non-exhaustive examples of different domains, a web image search, and a social media ranking.

In the web image-search domain, hyperlinks between websites may be considered to be functionally equivalent to citations. That is, a link from one website to another may be considered as a vote of confidence conferred upon the target page. If the source of the link is also a highly referenced (authoritative) page, then even more weight might be given to that vote of confidence.

However, such hyperlinks typically do not exist for web images. When website authors wish to mention or utilize an image, the typically do not just create a hyperlink to the original image. Instead, they will often make a copy of the image and perhaps modify it somewhat, via various application programs that might resize the image, crop the image, or perform some other modification to the image. The author may then re-post this modified image to their website. It is possible, therefore, that such copied images may effectively be referred to as a citation of the original image. The act of selecting a particular image to be reused may be seen as a form of citation on the part of the author. That is, a human editor might be suggesting that this particular image is subjectively "good" or "reliable" in some respect. Indeed, it may be observed that the most frequently copied images on the web might be considered to be objectively more likely to be relevant to a query and subjectively of higher quality or otherwise more iconic.

Thus, the concept of copying in web image domains, may be considered as equivalent to citation for images on the web, and abstracted to sources that are actually providing the images. That is, the sources of the images may be considered as individual web sites and therefore aggregation may be performed over individual cases of image copying across various websites into an overall propensity for citation between sources. The notion of authority may, again vary depending upon the topic of query being processed. Thus, for web image domains, sub-selecting of sources is again performed.

The process of tracing citation patterns across sources may employ, in one embodiment, the detection of near-duplicate images across a network. With image near-duplicate detection results, the invention may then aggregate inter-source citations and construct a source citation network across with to perform a ranking mechanism.

However, performing such actions may be infeasible across the possible billions of images that might be accessible over a network, such as the Internet. Therefore, the approach disclosed below populates lists of possible sources by issuing queries against selected web image-search engines and detecting near-duplicates within the resulting images that may be returned. Specifically, in one embodiment, near-duplicate detections may be limited to being conducted within the images returned for each query, which may be further constrained based on a given class dependency. This then is directed towards reducing the computational complexity of the discovery of near-duplicate images: multiple copies of the same image are typically far more likely to be returned within a same query rather than across disparate queries. Thus, the source citation network may be aggregated over these queries, rather than across an entire network search. That is, a source citation network may be extracted over repeated instances of copied images—the images being acquired by issuing a number of queries against one or more image search engines. Near-duplicate detection may then be conducted within the results for single queries, to further limit complexity.

Figure 5:
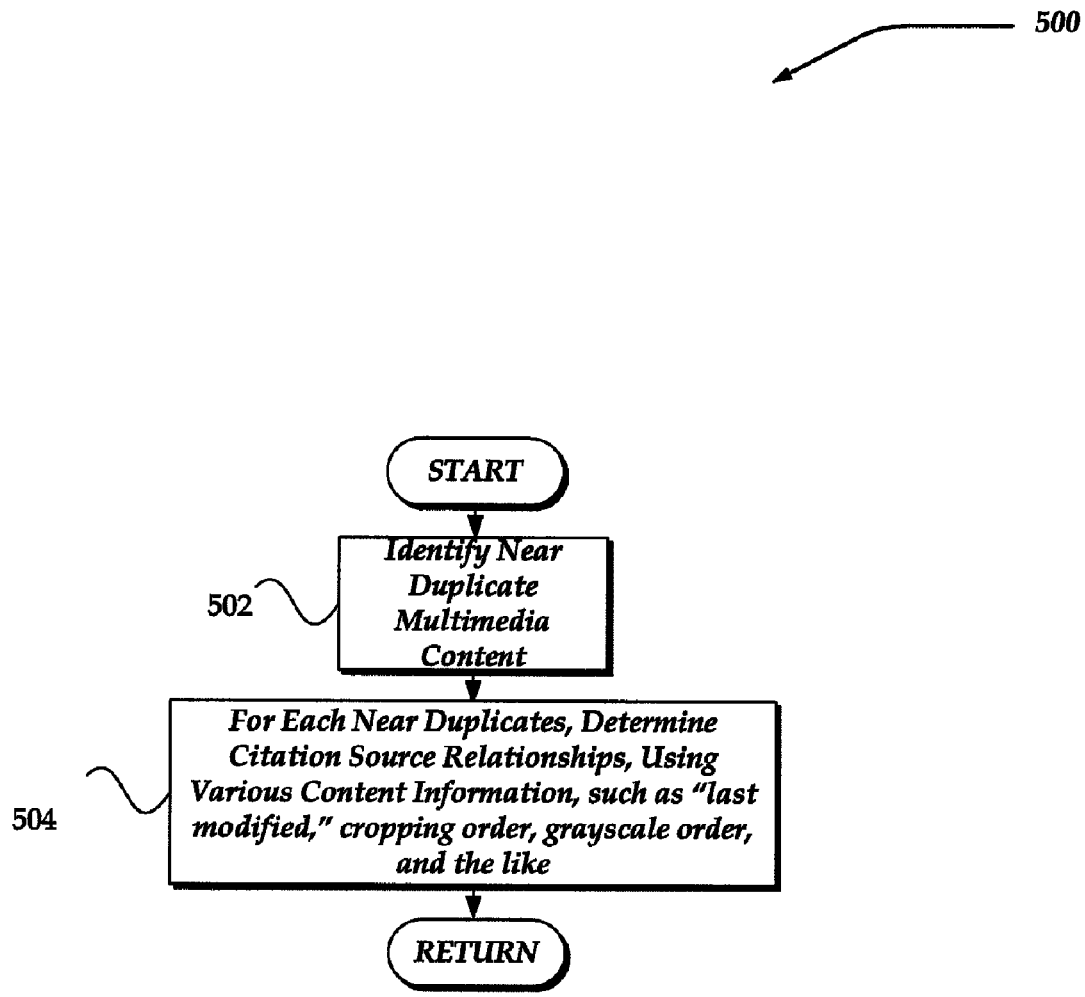
FIG. 5 illustrates a logical flow generally showing one embodiment of an overview process for use in identifying authoritative sources of multimedia content useable in rank ordering multimedia search-query results where the multimedia content is associated with a content copying domain.

Therefore, for web image search domains, FIG. 5 illustrates a logical flow generally showing one embodiment of an overview process for use in identifying authoritative sources of multimedia content useable in rank ordering multimedia search-query results where the multimedia content is associated with a content copying domain. Process 500 of FIG. 5 may be employed in conjunction with process 400 of FIG. 4. For example, process 500 may be employed to complement blocks 406 and 408 of process 400 to identify and otherwise construct citation networks.

Thus, process 500 may begin, after a start block, at block 502, where near duplicates are identified from within the results of a multimedia search-query. In duplicate detection, scale-invariant feature transform (SIFT) descriptors may be extracted for each image. These features typically capture local geometric properties around interest points within an image. SIFT descriptors are invariant against a number of distortions, such as scaling, rotation, and the like, and are robust against a number of other transformations. They are typically selected as being highly distinctive, and occurrences of such descriptors of a real-world point represented across different images can be matched with very high precision. That is, given two images, each with a set of SIFT interest points and associated descriptors, the invention may then perform an ambiguity rejection to discover correspondences between the interest points. To decide if two SIFT descriptors capture a same object, the distance between two descriptors may be obtained and a threshold applied to the resulting similarity to make a binary decision. In ambiguity rejections, this threshold may, in one embodiment, be set on a case-by-case basis, where for a given SIFT descriptor in an image, the nearest matching point in a second image is considered a match if an Euclidean distance between the two descriptors is less than a distance between a first descriptor and all other points in the second image by a give threshold. To ensure symmetry, various embodiments may also find matching points using a reverse process, matching from the second image against the first image. When a pair of points is found to be a candidate both through matching the first image against the second and through matching the second image against the first, then the candidate match may be taken as a set of corresponding points between the two images. Matching points using ambiguity rejection is expected to be highly similar to each other and highly dissimilar to all other points.

Figure 8:
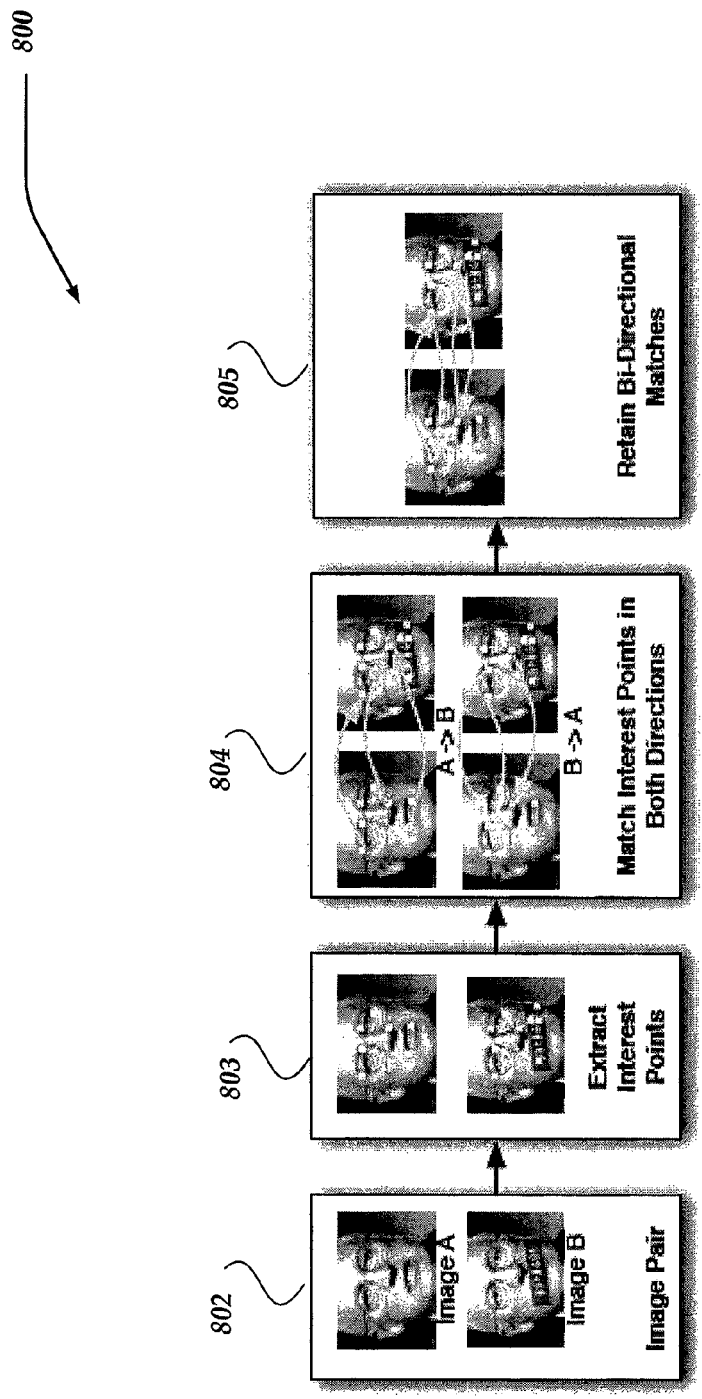
FIG. 8 illustrates a non-limiting, non-exhaustive example of a mechanism of near-duplicate detection employing ambiguity rejection.

Referring briefly to FIG. 8 a non-limiting, non-exhaustive example of a mechanism of near-duplicate detection employing ambiguity rejection is illustrated. As shown in process 800 of FIG. 8, two images are selected at block 802, image A and image B. At block 803, interest points for each image are selected and extracted ambiguity rejection analysis. At block 804, such matching of points as discussed above is performed in both directions, between image A to image B, and in the reverse, from image B to image A. At block 805, the bi-direction matching points are retained and employed to further confirm near duplicate detections between images.

Returning to process 500 of FIG. 5, the process next flows to block 504. At block 504, given two instances of an image, both of which are detected as near-duplicates of each other in block 502, a determination is made as to which source is the originator of the image and which source is merely citing that original image. Process 500 may then return to a calling process, such as process 400 of FIG. 4.

It is recognized that "citation" versions of images may be derived via a series of manipulation operations against the original image, such as color removal, cropping, scaling, or the like, all of which may be automatically detected to some extent. However, such analysis may be computationally intensive, therefore, various embodiments disclosed herein, analyze the various content information obtained during 404 of FIG. 4. That is, in one embodiment, information such as "last-modified" date is extracted from HTTP headers or the like for the images. Then, given a pair of near-duplicate images, it can be determined that the older file is being cited by the newer file, based on the "last-modified" dates. However, the invention is not constrained to merely employing date information, and other information may also be employed. For example, in another embodiment, cropping information may indicate an order in which the images are cropped, and therefore provide an indication of a source image. Similarly, grayscale information may also provide an indication of an image ordering. For example, it is more likely that a grayscale image is derived from a color image, than the reverse. Other content information may also be used to derive an image order.

As stated above, the generated citation network of relationships are constructed to reflect the propensity of citation between sources. The graph consists of sources (nodes) and citation propensities (weighted, directed edges). For each pair of near-duplicate images that are detected, an edge may be drawn between the sources (domains) of the images, directed from the citing source determined at block 504 to the original source. If multiple such pairs are discovered between two sources, the weight of the edge between the two sources may be weighted proportionally. Moreover, the weights of the edges may, in one embodiment, be normalized such that outlink weights from each node may sum to a value, such as one, or the like.

Figure 9:
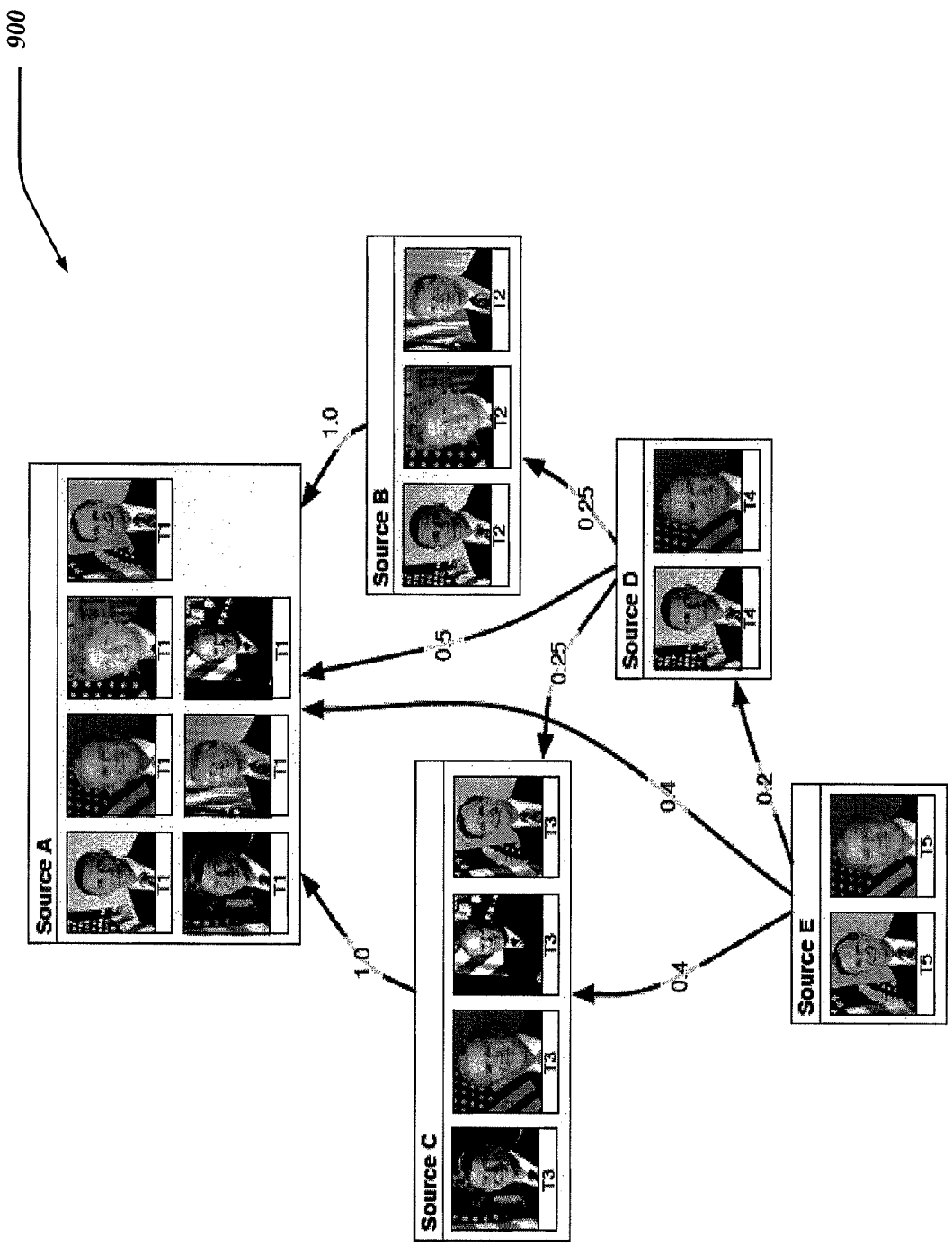
FIG. 9 illustrates a non-limiting, non-exhaustive example of a source citation network extracted from repeated images across multiple multimedia sources.

To illustrate this citation, FIG. 9 shows a hypothetical, non-limiting, non-exhaustive example of a source citation network extracted from repeated images across multiple multimedia sources. As illustrated, there are seven images in total dispersed across five different sources. In each source, the image is also tagged with a timestamp (T1-T5, where T1>T2>T3>T4>T5) and all images within a source may have an identical timestamp, for simplicity of the example. Source A has the oldest copies of all seven images. Only Source A is shown as having older copies of the images than either of sources B and C. Thus, both B and C have single edges directed towards A with a weight of 1.0. Source A has older copies of both images, while B and C have older copies of one of the images. Therefore, D has edges directed to A, B, and C, where the weight towards A is determined to be twice the weight to either B or C, which reflects the relative number of shared images between sources. Source E, similarly, shares two images with A and C, but only one with D, and therefore has edges to A and C that are double the weight of the edge to D.

As discussed above, each of the source citation networks may be generated for specific types of queries, in one embodiment. Thus, the resulting structures are purposefully selected subgraphs of a larger graph structure that might be obtained from all queries. The selection of such class queries may be determined based on a study of a plurality of different queries from users, from taxonomy analysis of previous content, or using any of a variety of content analysis mechanisms. Thus, FIG. 10 illustrates one non-limiting, non-exhaustive example of possible class-dependent categories useable for class-dependent search queries.

Process 500 of FIG. 5 shows how repeated behaviors of copying of images between websites may be employed, in one embodiment, to identify sources of image citation on a network; however, this approach does not necessarily apply in all situations. For example, many websites are actually authored by potentially millions of different authors, such as in the case of many social image sharing websites, such as Flickr, YouTube, or the like. Therefore, in one embodiment, each individual contributor may be considered as a source, rather than the entire site as one large source. This is because various users might exhibit different behaviors in capturing and tagging images.

Moreover, the behavior of copying and modifying images is often much less pronounced on social sharing sites than on, say, the Internet, at large. Therefore, in one embodiment, authority in social media applications may instead be derived from interactional cues, such as ratings, leaving comments, marking images as favorites by a user, identifying images as interesting, or the like. Such interactional cues may then be employed to abstract up from the images to the users who have provided the images. That is, in one embodiment, the users may be taken to be the sources and an aggregate propensity of each user to mark another user's image as a favorite may be employed as a relative weight of citation between the two sources. Therefore, in one embodiment, various metadata for images may be used to identify authoritative sources.

Figure 6:
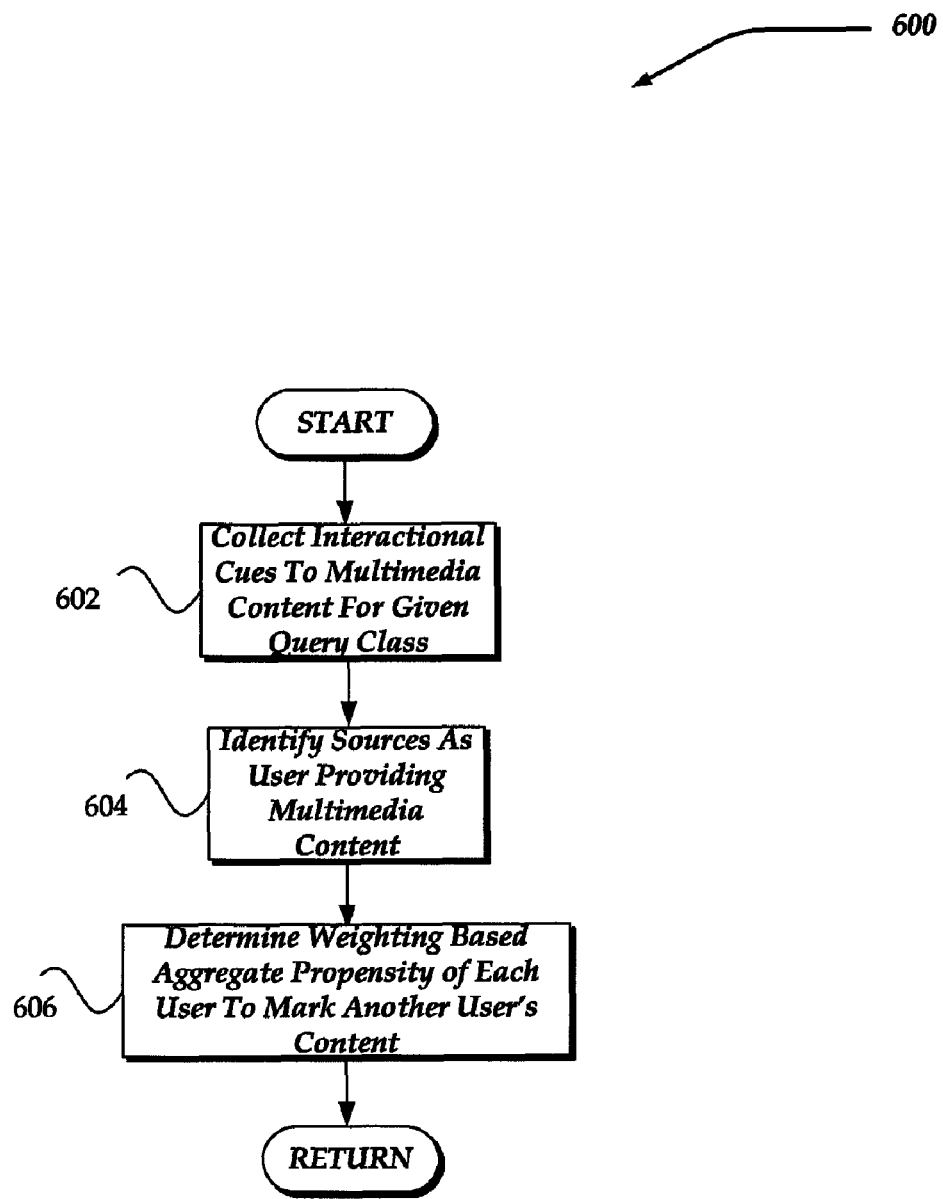
FIG. 6 illustrates a logical flow generally showing one embodiment of an overview process for use in identifying authoritative sources of multimedia content useable in rank ordering multimedia search-query results where the multimedia content is associated with a social network sharing domain.

FIG. 6 illustrates a logical flow generally showing one embodiment of an overview process for use in identifying authoritative sources of multimedia content useable in rank ordering multimedia search-query results where the multimedia content is associated with a social network sharing domain. Process 600 of FIG. 6 may be employed in conjunction with process 400 of FIG. 4. For example, process 600 may be employed to complement blocks 406 and 408 of process 400 to identify and otherwise construct citation networks to identify authoritative sources.

Thus, process 600 begins, after a start block, at block 602, where a snapshot of various social image source data stores may be performed to obtain information about the stored images, along with various interactional cues associated with the images. In one embodiment, the interactional cues may be obtained based on tags for given images, where a user might have marked an image as a favorite, or provided similar cues. In one embodiment, such image source data stores, or sites may be selected for analysis in a variety of ways, including, but not limited, for example, based on labeling of the images.

Processing continues to block 604, where a citation network may be generated from the resulting data. For each user, a list of images (or other multimedia content) may be obtained for which the user has labeled the image as a favorite. Each user may then be treated as a node and directed edges may be created from the user to every user that is an owner of one of the identified favorite images. Flowing next to block 606, outgoing edges between two users may be weighted to be proportional to a total number of photographs owned by the target user that have been identified as favorites by a source user. The total weights of outgoing edges from one user may again be normalized to sum to some value, such as one. Process 600 may then return to a calling process, such as process 400 of FIG. 4.

Again, such citation networks may be generated over all users, thereby providing a ranked list of which users are most likely to provide the most-liked images in general. However, not all users may be considered equally reliable or useful for all topics. Thus, the citation networks may, in one embodiment, instead by constructed for query class-dependent models for image citations by sub-selecting certain nodes from the overall network based on their relevance to various classes of queries. In one embodiment, the subgraphs may be derived by constraining the networks to contain those users who have posted images related to a class-dependent topic. For example, if the class topic is birds, then users that have uploaded images and tagged it with terms such as "bird", or equivalent, may be employed to construct the citation network based on the "favoriting" behavior of the users with that graph. This is directed towards yielding a scenario where users in the graph are anticipated as having some interest in the topic at hand, so both the citing and the cited photographers have some baseline interest in the particular class of queries.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

One key problem with many of the traditional ranking approaches is that they are ultimately reliant on a certain time lag between the creation of an image and the point at which the image has become largely copied and redistributed across the network. However, by ranking the images according to a "last-modified" date, or similar feature, such issue may be minimized. Thus, the embodiments described herein are directed towards not being subject to lags between publishing of content and a time at which it can be identified as important of authoritative. That is, the invention is directed towards enabling the finding of brand new content that is relevant.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over a network; and
   a processor that operates on the received data to perform actions, including:
   receiving a plurality of multimedia content including information about the content for each of the plurality of multimedia content;
   employing the information about the content to identify a source for each of the multimedia content;
   employing a weighted citation network of relationships based on the identified source for each multimedia content to identify authority scores for each source of the multimedia contents, the citation of network of relationships identifies a citation of multimedia content by network locations, and where the citation of the multimedia content is determined based on detecting that the multimedia content is copied instead of linked from one network location to an other network location;

receiving a class-dependent search-query for other multimedia content; and employing the identified authority scores to rank order a display of a search-query result to the class-dependent search-query.

2. The network device of claim 1, wherein the multimedia content comprises images and near-duplicate detection is employed to identify related multimedia content that is used to generate the citation network of relationships.

3. The network device of claim 2, wherein the near-duplicate detection further comprises employing an ambiguity rejection mechanism, in part by, measuring a distance between scale-invariant feature transform descriptors within at least two multimedia content images applying a threshold to determine whether the two multimedia content images match bi-directionally.

4. The network device of claim 1, wherein the information about the content comprises at least one of a "last-modified" date or image modification information, and wherein the "last-modified" date or image modification information is used to identify a source ordering of multimedia content within the citation network of relationships.

5. The network device of claim 1, wherein the processor operates to perform in actions, further comprising:

performing a plurality of class-dependent search queries for multimedia content over a social image sharing site; and wherein the information about the content includes whether a multimedia content is identified by a user within the social image sharing site as a favorite.

6. The network device of claim 1, wherein determining an authority score for each source within the citation network further comprises employing a machine-learning algorithm.

7. A system, comprising:

one or more network devices, each having stored thereon a plurality of multimedia content; and one or more other network devices, each other network device operates to access at least some of the plurality of multimedia content, and to perform actions, comprising:

performing a plurality of class-dependent search queries for multimedia content;

receiving multimedia content results for each of the plurality of queries including content information about each of multimedia content results;

employing the content information to identify a source for each of the multimedia content result;

employing a weighted citation network of relationships based on the identified source for each multimedia content to identify authority scores for each source within the weighted citation network, where the citation of the multimedia content is determined based on detecting that the multimedia content is copied instead of linked from one network location to an other network location;

receiving a class-dependent search-query for multimedia content; and employing the identified authority scores to rank order a display of a search-query result.

8. The system of claim 7, wherein the weighted citation network of relationships is generated to identify a citation of multimedia content within a query result.

9. The system of claim 7, wherein the multimedia content comprises images and near-duplicate detection is employed to identify related multimedia content.

10. The system of claim 9, wherein the near-duplicate detection further comprises employing an ambiguity rejection mechanism, in part by, measuring a distance between scale-invariant feature transform descriptors within at least two multimedia content images applying a threshold to determine whether the two multimedia content images match bi-directionally.

11. The system of claim 7, wherein the content information comprises at least one of a "last-modified" date or image modification information, and wherein the "last-modified" date or image modification information is used to identify a source ordering of multimedia content within the citation network.

12. The system of claim 7, wherein the plurality of class-dependent search queries are performed over a social image sharing site, and the content information includes whether an multimedia content is identified by a user within the social image sharing site as a favorite.

13. A non-transitory computer-readable storage device having computer-executable instructions, the computer-executable instructions when installed onto a computing device enable the computing device to perform actions, comprising:

performing a plurality of class-dependent search queries for multimedia content;

receiving multimedia content results for each of the plurality of queries including content information about each of multimedia content results;

employing the content information to identify a source for each of the multimedia content result;

employing a weighted citation network of relationships based on the identified source for each multimedia content to identify authority scores for each source within the weighted citation network, the citation of network of relationships identifies a citation of multimedia content by network locations, and where the citation of the multimedia content is determined based on detecting that the multimedia content is copied instead of linked from one network location to an other network location;

receiving a class-dependent search-query for multimedia content; and employing the identified authority scores to rank order a display of a search-query result.

14. The non-transitory computer-readable storage device of claim 13, wherein the weighted citation network of relationships identifies a citation of multimedia content within a query result.

15. The non-transitory computer-readable storage device of claim 13, wherein the multimedia content comprises images and near-duplicate detection is employed to identify related multimedia content that is used to generate the citation network of relationships.

16. The non-transitory computer-readable storage device of claim 15, wherein the near-duplicate detection further comprises employing an ambiguity rejection mechanism, in part by, measuring a distance between scale-invariant feature transform descriptors within at least two multimedia content images applying a threshold to determine whether the two multimedia content images match bi-directionally.

17. The non-transitory computer-readable storage device of claim 13, wherein the content information comprises at least one of a "last-modified" date or image modification information, and wherein the "last-modified" date or image modification information is used to identify a source ordering of multimedia content within the citation network.

18. The non-transitory computer-readable storage device of claim 13, wherein the plurality of class-dependent search queries are performed over a social image sharing site, and the content information includes whether an multimedia content is identified by a user within the social image sharing site as a favorite.

19. The non-transitory computer-readable storage device of claim 14, wherein determining an authority score for each source within the citation network further comprises employing a machine-learning algorithm.

* * * * *